United States Patent [19]

Diederich et al.

[11] Patent Number: 5,240,407
[45] Date of Patent: Aug. 31, 1993

[54] PROCESS FOR PRODUCING A STURDY REFRACTORY METAL OXIDE ARTICLE

[75] Inventors: Walter J. Diederich, West Newbury; Robert E. Nelson, Weston, both of Mass.

[73] Assignee: TPV Energy Systems, Inc., Waltham, Mass.

[21] Appl. No.: 205,164

[22] Filed: Jun. 10, 1988

Related U.S. Application Data

[60] Division of Ser. No. 833,322, Feb. 24, 1986, Pat. No. 4,883,619, and a continuation-in-part of Ser. No. 515,011, Jul. 20, 1983, Pat. No. 4,975,044, and a continuation-in-part of Ser. No. 408,511, Aug. 16, 1982, abandoned.

[51] Int. Cl.$^5$ .................. C04B 33/32; F21H 7/00
[52] U.S. Cl. .................. 431/110; 264/60; 264/65; 264/66; 264/221; 264/317; 431/100; 427/159
[58] Field of Search .......... 264/65, 60, 66, 221, 264/317; 431/110, 100, 112; 427/159; 252/492

[56] References Cited

U.S. PATENT DOCUMENTS

| 396,347 | 1/1889 | Welsbach | 431/100 |
|---|---|---|---|
| 409,528 | 8/1889 | Welsbach | 252/492 |
| 563,524 | 7/1896 | Welsbach | 252/492 |
| 590,855 | 9/1897 | Sieverts | 264/60 |
| 931,920 | 8/1909 | Gleason | 431/100 |
| 1,993,778 | 3/1935 | Francis | 427/159 |
| 3,385,915 | 5/1968 | Hamling | 264/5 |
| 3,649,157 | 3/1972 | Klauer | 431/100 |
| 3,663,182 | 5/1972 | Hamling | 23/355 |
| 4,533,317 | 8/1985 | Addison | 431/100 |
| 4,975,044 | 12/1990 | Diederich | 427/159 |

FOREIGN PATENT DOCUMENTS 104668 1/1898 Fed. Rep. of Germany.
150494 8/1903 Fed. Rep. of Germany.
244406 10/1909 Fed. Rep. of Germany.

OTHER PUBLICATIONS

Martin, The Rare Earth Industry, Crosby, Lockwood and Son, London, (1918) pp. 14–29.
Ives, et al., "A Physical Study of the Welsbach Mantle", Journal of The Franklin Institute, vol. 186, (Oct. and Nov. 1918).
Kremers, Encyclopedia of Chemical Technology, "Gas Mantles" (1952) vol. 8, pp. 192–197.
Mason, "Development of Gaslight Emitters with Improved Durability", Inst. Gas Technol. Tech. Rep. No. 9 19 pages (1964).
Diver, et al. "Thoria Effusion Membranes" American Ceramic Society Bulletin, vol. 56, No. 11, (1977).

Primary Examiner—James Derrington
Attorney, Agent, or Firm—Fish & Richardson

[57] ABSTRACT

A process for producing a sturdy refractory metal oxide article includes the steps of heating a substrate of organic material impregnated with a metal compound to thermally decompose the compound without substantial thermal decomposition of the substrate, further heating to decompose and remove the organic material and complete conversion of the compound to a metal oxide so that a metal oxide replica of the substrate remains and further heating to sinter and densify the replica such that the replica has a strength (shock resistance) figure of merit of at least three g-meters and the replica retains such strength after heating to 1500 C.

22 Claims, 1 Drawing Sheet

PROCESS FOR PRODUCING A STURDY REFRACTORY METAL OXIDE ARTICLE

This application is a divisional application of prior application Ser. No. 833,322, filed Feb. 24, 1986, now U.S. Pat. No. 4,883,619; which in turn was a continuation-in-part of prior applications Ser. No. 408,511, filed Aug. 16, 1982, now abandoned, and Ser. No. 515,011, filed Jul. 20, 1983, now U.S. Pat. No. 4,975,044.

This invention relates to processes for producing refractory metal oxide articles that are particularly useful as radiation sources of the gas mantle type.

Gas mantle type articles are typically heated to incandescent temperature by a gas flame and provide effective radiation sources. Such mantles have been prepared by impregnating yarns or sleeves of rayon or other organic fiber with a nitrate containing compound, denitrating the fabric with ammonia water or ammonia gas, with hydrofluoric acid or alkali fluoride solutions, or with solutions or vapors of organic bases to convert the nitrate to an insoluble hydroxide or fluoride, and then burning off the organic material. It is well known that such mantles are extremely fragile and subject to destruction or damage by accidental jarring or other relatively mild stresses.

In accordance with an aspect of the invention, there is provided an improved process for producing a sturdy refractory metal oxide article which includes the steps of heating a substrate of organic material impregnated with a metal compound to increase at a controlled rate the temperature of the impregnated substrate to a temperature sufficiently high to thermally decompose the metal compound as a step in the conversion of the metal compound to a refractory metal oxide; further heating the impregnated substrate to decompose and remove the organic material from the impregnated substrate and to complete the conversion of the metal compound to the refractory metal oxide so that a metal oxide replica of the substrate remains; and further heating the metal oxide replica to sinter and densify the metal oxide replica such that the densified metal oxide replica is sturdy and its strength is retained after the replica has been heated to 1500° C., in contrast with more fragile prior art metal oxide replica structures. The exact choice of reaction conditions depends on the shape and chemical composition of the starting organic material and on the metal compound or metal compounds employed in the impregnation step. A preferred organic material for use in the process for producing metal oxide articles of the invention is low twist rayon yarn. However, substrates of configurations other than fibrous and other absorbant materials that absorb adequate amounts of the imbibing solution and that thermally decompose without melting, such as cotton, wool, silk, and certain synthetic materials may also be used. The metal compound and organic substrate material have interaction characteristics such that (in a suitable processing sequence in accordance with the invention) the metal compound undergoes thermal conversion to a skeletal substrate replica (with healable fissures or rifts) before thermal decomposition of the organic material is completed, the further resulting gaseous decomposition products being removed from the replica through the rifts. A preferred metal compound is a nitrate, but other compounds may also be used. The metal compound can be impregnated into the organic material (uniformly distributed within the fibrils) by any of several methods. Articles of various configurations may be formed in accordance with the invention, such metal oxide articles having a number of uses in addition to use as gas mantles.

In preferred processes, the absorbant substrate is a fabric, for example, a tubular sleeve that is knitted from continuous multi-filament low twist, low tenacity (highly reticulated) viscose rayon yarn. This fabric substrate is imbibed in an aqueous solution of nitrate salts, the imbibed and dried substrate having a white color and a shiny texture.

The imbibed fabric substrate is then thermally processed under controlled conditions. Initially, the temperature of the substrate is gradually increased in an atmosphere with little or no oxygen present (preferably an oxygen partial pressure of less than two mm Hg). When a temperature of 130° C. to 170° C., is reached, a quite vigorous thermal denitration reaction occurs, involving an interaction between the nitrate salts and the cellulosic substrate, which is visually evidenced by a color change that starts at some location in the substrate and produces a front which separates a tan color from the shiny white color and advances through the substrate in a few seconds. This reaction is termed a "nitrate burn" and is believed to involve a partial oxidation of the cellulose of the substrate by the decomposition products of the nitrate ions—the gases produced by the thermal decomposition of the nitrate salts being strongly oxidizing and reacting with the cellulose. There is some evidence that an intermediate compound such as an oxynitrite (ThO $(NO_2)_2$) is formed. An oxygen scavenging agent (such as hydrogen) is optionally useful in controlling the rate of this "nitrate burn" reaction, for example in the case of more dense (less open area) fabrics or other substrates. The complex "nitrate burn" reaction evolves heat and a large amount of gas (including carbon monoxide and oxides of nitrogen), the evolved carbon monoxide being evidence that a combustion reaction occurred. Differential scanning calorimeter data shows this reaction to be rapid and exothermic. Controlled and rapid denitration appears important to the subsequent formation of mantles that are strong after heating to 1600° C. and above.

After the nitrate burn, the substrate is heated in an atmosphere that contains an increased amount of oxygen (preferably an oxygen partial pressure greater than twenty mm Hg) during which the remaining cellulose is pyrolyzed and the residual carbon is removed by oxidation. During this continued heating, the gas evolution slows, but continues to about 475° C. where the replica is a metal oxide. The temperature is further increased to sinter and densify the metal oxide replica. Beneficial sintering and densification of the metal oxide replica continue to occur until temperatures of at least about 1500° C. are reached. The resulting metal oxide product has a strength that is substantially greater than the strength of prior art metal oxide products of similar configuration.

Without intending to be bound by the same, the theory and mechanism of this process appear to be as follows: When a fabric of organic polymeric material, such as cellulose, is immersed in an aqueous solution of a metal compound, it swells and the dissolved metal compound enters the swollen regions. Upon drying, the metal compound in the fibers is effectively suspended and separated as small islands. The heating of the impregnated organic material under controlled conditions converts the metal compound to an oxide structure that is a replica of the organic fabric material, the oxide fibers of the replica structure having healable rifts or fissures. Gaseous products which are evolved upon further thermal decomposition of the organic material are released through the healable fissures without significant impairment of the oxide replica. Further heating of the replica to higher temperatures increases the strength of the replica. It is believed that this healing and strengthening action involves solid state diffusion which blunts or rounds the roots of the crack-like fissures or rifts, thus reducing their severity. In some cases, the rifts may heal entirely.

In particular processes, the fabric is imbibed in an aqueous solution of nitrate salts that have a molar concentration of less than 2.0, preferably in the range of 0.8–1.0 molar in the case of thorium nitrate and in the range of 1.1–2.0 molar in the case of ytterbium nitrate, particular compositions containing thorium nitrate, cerium nitrate and aluminum nitrate in concentrations such that the final sintered product contains ceria in the amount of 0.5–3.0 weight percent and alumina in the amount of 0.1–2.0 weight percent, and a particular composition having about two percent by weight cerium oxide and about one percent by weight aluminum oxide in the final sintered product. A rayon fabric is imbibed in the metal nitrate solution at about 20° C. for about ten minutes, and then is centrifuged to remove excess solution from the surface of the fibers.

The impregnated organic fiber fabric is then shaped with the use of a shaping form into the desired configuration, in a particular case a mantle sock, and then dried. The shaped impregnated dried fabric sock is then positioned on a support post of a processing fixture with the sock surrounding a tube of heat-resistant material such as stainless steel or ceramic carried on the support post and with the closed end of the sock spaced a predetermined distance above the upper end of the tube; and thermally processed under controlled conditions as described above to initiate conversion of the metal nitrates to metal oxides in a denitration step, then to complete the decomposition of the rayon fibers and the conversion to metal oxide, the resulting gases being evolved through the fissures without impairing the healability characteristics of fissure-type defects in the metal oxide, and then to heat the resulting metal oxide fabric replica to temperatures of at least about 1000° C. to sinter and densify the metal oxide particles. In one preferred product, the resulting metal oxide mantle is composed essentially entirely of thoria, ceria and alumina, while in other preferred products, the resulting metal oxide mantle is composed essentially entirely of ytterbia or of erbia.

The following processes for producing metal oxide fibers from impregnated cellulosic fibers employ examples of preferred reaction conditions. In each process, an open area type of absorbant cellulosic substrate is impregnated by immersing it in an aqueous solution of a suitable metal nitrate. Excess solution is then carefully removed and the impregnated substrate is formed (if desired) and dried. In a first process, the denitration step is carried out by heating an impregnated substrate of relatively large open area in a flowing inert gas atmosphere while raising the temperature at a uniform rate (preferably at least 2° C. per minute) from room temperature to 320° C. during which interval denitration occurs.

The impregnated organic fiber fabric is then shaped with the use of a shaping form into the desired configuration, in a particular case a mantle sock, and then dried. The shaped impregnated dried fabric sock is then positioned on a support post of a processing fixture with the sock surrounding a tube of heat-resistant material such as stainless steel or ceramic carried on the support post and with the closed end of the sock spaced a predetermined distance above the upper end of the tube; and thermally processed under controlled conditions as described above to initiate conversion of the metal nitrates to metal oxides in a denitration step, then to complete the decomposition of the rayon fibers and the conversion to metal oxide, the resulting gases being evolved through the fissures without impairing the healability characteristics of fissure-type defects in the metal oxide, and then to heat the resulting metal oxide fabric replica to temperatures of at least about 1000° C. to sinter and densify the metal oxide particles. In one preferred product, the resulting metal oxide mantle is composed essentially entirely of thoria, ceria and alumina, while in other preferred products, the resulting metal oxide mantle is composed essentially entirely of ytterbia or of erbia.

The following processes for producing metal oxide fibers from impregnated cellulosic fibers employ examples of preferred reaction conditions. In each process, an open area type of absorbant cellulosic substrate is impregnated by immersing it in an aqueous solution of a suitable metal nitrate. Excess solution is then carefully removed and the impregnated substrate is formed (if desired) and dried. In a first process, the denitration step is carried out by heating an impregnated substrate of relatively large open area in a flowing inert gas atmosphere while raising the temperature at a uniform rate (preferably at least 2° C. per minute) from room temperature to 320° C. during which interval denitration occurs (approximately at 150° C.); then an oxygen flow (about three percent of the nitrogen flow) is added and the chamber temperature is held at 320° C. for a soaking interval during which time the cellulosic substrate pyrolyses and oxidizes until no visual evidence of residual carbon remains; at the end of that soaking interval the oxygen flow is increased to about twenty-five percent of the nitrogen flow and the chamber temperature is rapidly increased to 900° C. to sinter and densify the metal oxide particles; and then the resulting porous thoria structure is heated to a temperature of about 1600° C. in an isobutane flame for about five minutes for further thoria particle sintering and densification.

In a second process, the denitration step is carried out by heating an impregnated porous fabric sleeve in a low pressure environment, the temperature being gradually increased from 100° C. to 200° C. over an interval of about twenty minutes during which interval denitration occurs; the denitrated fabric is then heated in an air atmosphere with temperature gradually increased from 240° C. to 450° C. over an interval of about one hour during which interval the rayon fabric is pyrolysed and the residual carbon is removed by oxidization; the resulting metal oxide replica is then heated at a temperature of about 1000° C. for ten minutes; and finally the metal oxide replica is heated at a temperature of about 1600° C. for five minutes.

In still further processes, the denitration step is carried out by heating a porous fabric of lesser open area (greater density) that has been impregnated with ytterbium nitrate in a flowing gas atmosphere (that primarily is an inert gas such as nitrogen with a minor amount of hydrogen (at volume percents of up to about five percent and initial hydrogen partial pressures of up to about forty mm Hg in particular embodiments) as an oxygen scavenging agent) while raising the temperature at a uniform rate (preferably at least 2° C. per minute) from room temperature to 325° C. during which interval denitration occurs (approximately at 150° C.); then the hydrogen flow is terminated and an oxygen flow (about five percent of the nitrogen flow) is added and the chamber temperature is held at 325° C. for a soaking interval during which time the cellulosic substrate pyrolyses and oxidizes until no visual evidence of residual carbon remains; at the end of that soaking interval the oxygen flow is increased to about thirty percent of the nitrogen flow and the chamber temperature is rapidly increased to 900° C. to sinter and densify the metal oxide replica; and then the resulting ytterbia structure is heated to a temperature of about 1600° C. in an isobutane flame for about five minutes for further ytterbia sintering and densification.

The resulting metal oxide fabrics, in visual appearance, substantially retain characteristic physical textile attributes of their precursor organic fabrics, although they are substantially reduced in dimension. The processes, since they are based on precursors, are not limited to cylindrical emitter geometries, and planar emitters, for example, are also feasible. The invention, in particular embodiments, provides improved gas mantle and similar metal oxide fabric structures composed substantially entirely of fibers of oxides of one or more of the metals erbium, thorium, zirconium, ytterbium, yttrium, hafnium, aluminum, magnesium, calcium, cerium and other rare earth metals, and that have substantially greater shock load resistance than prior mantles. The shock load is the force experienced by the unsupported mantle because of rapid deceleration on impact of the support tube against a stop. This load is often expressed in g's, where g is the acceleration due to gravity. While such mantle shock resistance is a function of factors such as mantle size, shape, mechanical construction (yarn size, type of weave, open area, etc.) and mantle support, a useful shock resistance figure of merit for a cantilever supported mantle is a function of both length and diameter of the mantle—in the case of a cantilever supported mantle whose length and diameter dimensions are similar, a useful shock resistance figure of merit is provided, to a first order approximation, by the product of the shock load (in g's) that the mantle withstands and the unsupported length (in meters) of the mantle. Those metal oxide fabrics are characterized by relatively high density, strength (preferrably a shock resistance figure of merit of at least three g-meters) and flexibility, and in preferred mantle configurations are efficient radiation sources (a luminous efficiency of at least one-half lumen per watt and an output of at least ten lumens with a one gram per hour isobutane flow rate) and withstand impact loads in excess of 600 g's.

Particular metal oxide radiator structures include a self-supporting fabric of metal oxide fibers that distort elastically in a configuration that includes a skirt portion that is shrink secured to a ceramic support tube,. The metal oxide fibers of that mantle, after heating in an isobutane flame, have a microstructure with a significant number of grains of dimensions in the order of one to two micrometers, and well-delineated grain boundaries, and are efficient in converting thermal energy to radiant energy. The flexibility, or ability of the mantle fabric to undergo considerable elastic distortion without fracture, is evidence of the high strength of this improved material.

In particular radiators of the gas mantle type, the fabric is knitted in such a way that the yarn yields a self-supporting sleeve of metal oxide fibers which is heated to incandescence by a gas flame. This sleeve of metal oxide fibers can be distorted to a large degree by an external force; in such distortion the yarn filaments bend or twist elastically, and when the force is removed they regain their original shape, restoring the initial configuration of the mantle. Mantles in accordance with this aspect of the invention are able to undergo much larger elastic distortions without fracture than mantles of similar weaves or knits prepared by conventional methods.

The elementary metal oxide fibers of preferred radiators have a cross-sectional dimension of approximately one third the cross-sectional dimension of the precursor organic fiber and the mantle has a skirt portion that is shrink secured to a heat-resistant support tube, and the mantle withstands shock loads in excess of six hundred g's. While such mantles are useful in a variety of devices, including thermophotovoltaic devices and the like, a particular use is in portable light sources of the flashlight type.

Other features and advantages will be seen as the following description of particular embodiments progresses, in conjunction with the drawings, in which.

DESCRIPTION OF PARTICULAR EMBODIMENTS

Figure 1:
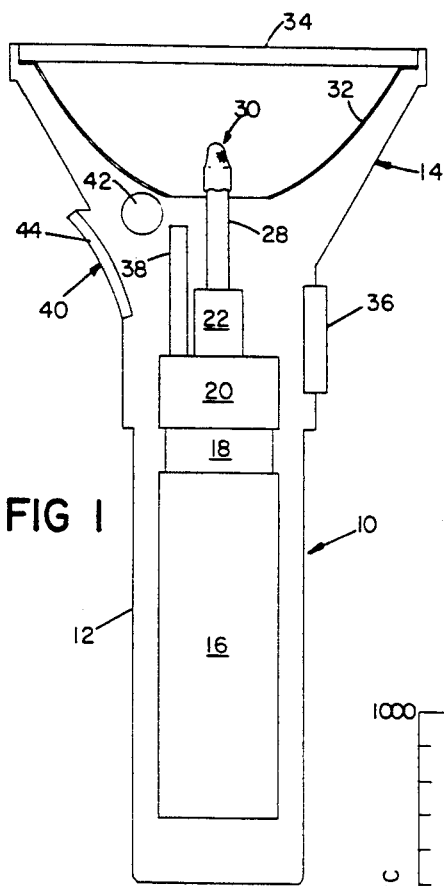
FIG. 1 is a diagrammatic view of a portable light source of the flashlight type in accordance with aspects of the invention.

Shown in FIG. 1 is a flashlight 10 that has a handle portion 12 and a head portion 14. Disposed in handle 12 is a container 16 of isobutane fuel—a charge of twenty grams with an equilibrium vapor pressure at room temperature of thirty psi—together with pressure regulator 20 to provide two psi fuel pressure at regulator outlet orifice (0.05 millimeter diameter). Valve 18 controls the flow of gas through regulator 20 and venturi 22 (that has a throat of about one millimeter diameter and provides an air fuel ratio of about 30:1) to support tube 28 which carries metal oxide fiber mantle 30. Reflector 32 directs radiation from mantle 30 in a collimated beam of light through lens 34. Control switch 36 operates valve 20 to provide flows of fuel to venturi 22 and to pilot tube 38. Igniter 40 includes flint wheel 42 or other suitable igniter such as a piezoelectric device that is operated by lever 44 to ignite pilot fuel which in turn ignites the main flow of fuel in mantle 30. The flashlight has a rating of about fourteen watts, consumes fuel at a rate of about one gram per hour (a vapor flow rate of about seven cubic centimeters per minute) and has a luminous efficiency of about one lumen per watt. Further details of the construction of this flashlight may be had with reference to copending application Ser. No. 408,549 filed Aug. 16, 1982 in the names of Walter J. Diederich and George P. Gruner, entitled TWO-STAGE PRESSURE REGULATOR, and assigned to the same assignee as this application, which application has issued as U.S. Pat. No. 4,497,339 and is expressly incorporated herein by reference.

Figure 2:
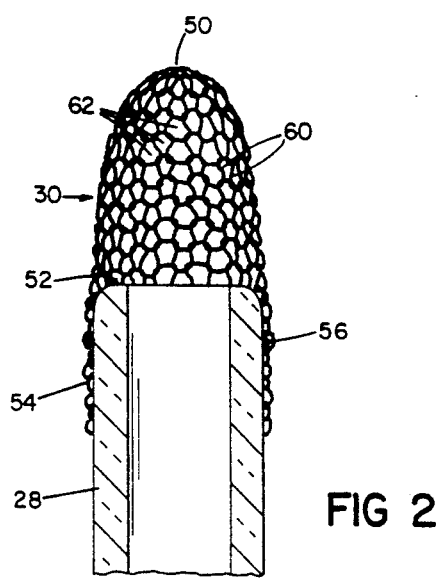
FIG. 2 is an enlarged view of the mantle and its support employed in the flashlight of FIG. 1.

Further details of mantle 30 and its support tube 28 may be seen with reference to FIG. 2. Support tube 28 is of mullite and has a length of about 25 millimeters, an outer diameter of about five millimeters, and an inner diameter of about three millimeters. Mantle 30 is a self-supporting structure of metal oxide fiber fabric that defines a hollow chamber of about seventy cubic millimeters volume with its tip 50 about one half centimeter above the upper end surface 52 of support tube 28. The skirt 54 of the mantle fabric (about one-half centimeter in length) is firmly secured (shrink fitted) to the outer surface of support tube 28. The shape of the outer surface of support tube 28 may be varied to achieve desired mantle configurations, for example a fluted mantle sidewall shape. Auxiliary means such as an inorganic cement 56 or a recess may optionally be used to enhance the securing of mantle 30 to tube 28.

The mantle fabric is formed of metal oxide multifilament strands 60 in an open knit array with openings 62 such that the open area of the fabric is about 60%. The cross-sectional dimensions of the individual fibers of strands 60 are in the range of about 5–10 micrometers and the strands 60 have cross-sectional dimensions in the order of about 0.1 millimeter with the openings 62 having dimensions of about 0.5 millimeter.

The following is a process for manufacturing mantle 30. Continuous low twist, low tenacity (highly reticulated), viscose rayon yarn 60 (150 denier/42 filament) is knitted into a continuous tubular sleeve using a Lamb circular string knitter (Model ST3A/ZA) with a ⅜ inch diameter arbor and 24 needle capacity using 14 needles in the arbor in the sequence: NNONONONNONON-NONONONNNONO, where "N" represents a slot filled with a needle and "O" represents an open slot. The yarn is knitted with tension on both the yarn and the knitted sleeve to attain nine stitches per linear inch of tensioned sleeve, and the continuous length of knitted sleeve is wound onto a take-up spool.

An imbibing solution is formed by dissolving (1) hydrated thorium nitrate ($Th(NO_3)_4 \cdot 4 H_2O$) powder (reagent grade); (2) hydrated cerium nitrate ($Ce(NO_3)_3 \cdot 6 H_2O$) powder (reagent grade); and (3) hydrated aluminum nitrate ($Al(NO_3)_3 \cdot 9 H_2O$) powder (reagent grade) in distilled water (together with a small amount of a non-ionic wetting agent such as Triton X-100) to provide a solution 0.9 molar in thorium nitrate, 0.03 molar in cerium nitrate and 0.03 molar in aluminum nitrate.

Knitted rayon sleeve units, in lengths of about thirty centimeters, are immersed for about ten minutes in the imbibing solution at room temperature, with optional gentle agitation to promote penetration of the imbibing solution into the rayon fibers. After the ten minute imbibition, the sleeves are removed from the solution, squeeze dried and then transferred to plastic tubes of a centrifuge. The sleeves are then centrifuged for ten minutes at about 200 g's to remove surface liquid. It is convenient to secure a metal screen halfway from the bottom of each centrifuge tube so that liquid does not rewet the surface of the sleeve during or after centrifugation.

Figure 3:
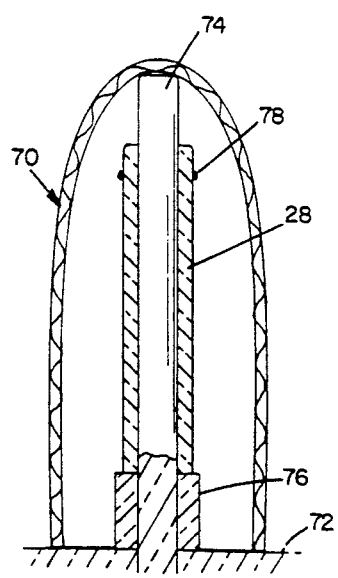
FIG. 3 is a view of a portion of a fixture used in the manufacture of the mantle shown in FIG. 2.

After centrifugation, the imbibed sleeves are formed into mantle socks with aid of a Teflon sock-shaping rod that is about fourteen millimeters in diameter and has a hemispherical end. Each imbibed sleeve is cut into lengths of about seven centimeters, slipped over the shaping rod, and tied off at the hemispherical end of the shaping rod with a piece of treated yarn unraveled from the bottom of the knit sleeve. One loop of yarn is passed around the knit sleeve just above the hemispherical top of the rod and tied with a double overhand knot. The free ends of the yarn and of the sleeve above the knot are cut as short as possible. The shaped socks 70 are then dried with a flow of hot (about 90° C.) air, slipped off the shaping rods, cut to lengths of about 3.6 centimeters, and then hung on a fixture that includes mullite base 72 and a series of upstanding mullite posts 74 (spaced at about three centimeter intervals on base 72. Each post 74 has a diameter of about 3 millimeters and a length of about 3.7 centimeter and receives a support tube 28 and spacer 76 as indicated in FIG. 3, the top of tube 28 being spaced about five millimeters below the top of post 74. Optionally a ring 78 of sodium silicate that has been pretreated by heating tube 28 to about 300° C. may be carried by tube 28 as indicated in FIG. 3.

The fixture with knitted imbibed socks 70 hung over the support sleeves 28 on the fixture posts 74 is then subjected to a firing procedure to convert the metal nitrate imbibed cellulosic mantle socks into light emitting and mechanically strong metal oxide mantles.

Figure 4:
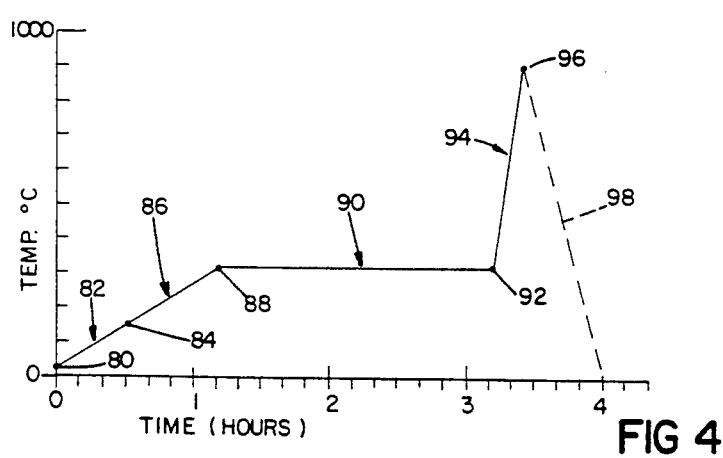
FIGS. 4 and 5 are graphs indicating particular processing sequences for the manufacture of mantles in accordance with the invention.

In the processing sequence illustrated in FIG. 4, the fixture with socks 70 is placed in a tubular oven that is about 1.2 meters in length and about five centimeters in inner diameter. At ambient temperature (about 25° C. (point 80)), the oven is flushed with tank nitrogen at a flow rate of 200 cubic centimeters per minute (a flow velocity of about ten centimeters per minute), and with this inert atmosphere in the oven, the oven temperature is increased at a rate of four degrees Celsius per minute as indicated at line 82. The mantle fabric 70 undergoes denitration at about 150° C. (point 84). At this point the fabric color changes rapidly from white to golden tan. Immediately after this color change (point 84), oxygen is added to the nitrogen flow at a rate of about five cubic centimeters per minute. Heating continues at the same rate as indicated by line 86 to a temperature of about 320° C. (point 88). During this time the color continuously changes from golden tan to dark brown or black with modest shrinkage (about 10%) of the fabric, which indicates additional decomposition of the organic material. Continuing from point 88, the oven temperature is then held at about 320° C. for as long as it takes the mantles to turn from black to light gray or white (about two hours). During this soaking interval (indicated by line 90 in FIG. 4), the remaining carbon is oxidized and driven off and the mantle shrinks to about ⅓ its original dimensions with its skirt portion 54 shrunk onto sleeve 28 essentially as shown in FIG. 2. At the end of the soaking interval, (at point 92) the flow of oxygen is increased to fifty cubic centimeters per minute (a gas mixture of 20% oxygen) and the oven temperature is rapidly increased as indicated at line 94 to a temperature of 900° C. (point 96). The heater is then turned off and the oven cools to ambient temperature as indicated at 98.

After cooling, each mantle subassembly is removed from its storage holder post 74 and is optionally exposed to a burning mixture of isobutane and air (at an estimated temperature of about 1600° C.) for five minutes to further shrink and densify the metal oxide fabric.

The mantle 30 with its support tube 28 is evaluated for shock strength. In one test mechanism, the mantle-support tube assembly is secured to a ¼ pound weight with a set screw in either a vertical or a horizontal orientation. The weight slides on a six foot vertical steel rod that passes through a hole in the ¼ pound weight and, at the bottom of the steel rod, the weight impinges on a spring that has a force constant of 810 pounds per inch. A drop height of six feet represents a shock load of about 620 g's, a drop height of five feet represents a shock load of about 570 g's, a drop height of about four feet represents a shock load of about 510 g's, and a drop height of three feet represents a shock load of about 445 g's. Mantles have also been tested with a L A B Automatic Drop Shock Tester (Model SD-10-66-30) (available from Material Technology Incorporated) which is used with a Type 5520.5.85 Decelerating Device (pulse pad) for shock loads of up to about 600 g's and with a Type 5520.5.28 Decelerating Device (pulse pad) for shock loads of up to 1600 g's. The following is a summary of results of such tests on mantles in accordance with the invention:

| | STRENGTH OF MANTLES | | | |
|---|---|---|---|---|
| Mantle Diameter (D) (mm) | Mantle Length (L) (mm) | Average Fracture Load (g's) | Range of Fracture Loads (g's) | Figure of Merit (g-meters) |
| 5 | 6 | 983 | 800–1600 | 5.9 |
| 13 | 18 | 480 | 400–600 | 10–12.5 |

In contrast, prior art Valor (German Railway) mantle subassemblies (9 mm mantle diameter and 8 mm mantle length) tested with the LAB Tester failed at average fracture loads of 152 g (78–280 g range) - a figure of merit value of 1.2 g-meters; and prior art Coleman mantle subassemblies (25 mm mantle diameter and 28 mm mantle length) failed at average fracture loads of 80 g (60–90 g range) - a figure of merit of 2.2 g-meters.

The mantle-support tube subassembly is installed in the flashlight 10. With a fuel flow of nine cubic centimeters per minute and a roughly stoichiometric air fuel ratio, the flashlight has a light output in the range of 15-19 lumens.

Figure 5:
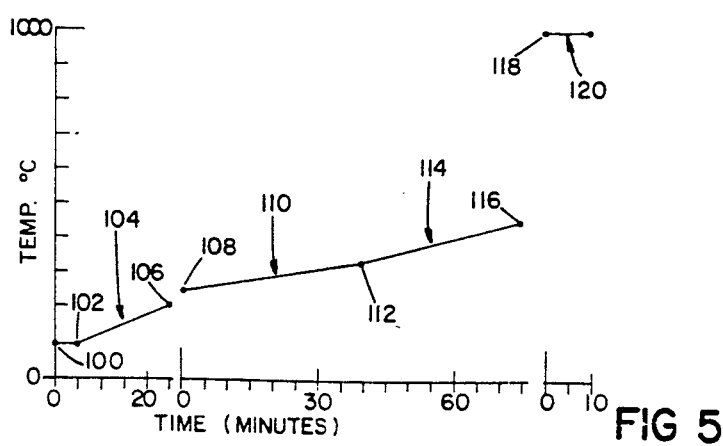

A second processing sequence is illustrated in FIG. 5. Fixture 72 with hanging imbibed socks 70 is placed in a vacuum oven (preheated to approximately to 100° C. - point 100) and the oven is pumped down with a mechanical vacuum pump over an interval of about five minutes to a pressure of five millimeters of mercury (interval 102 - FIG. 5). The temperature of the oven is then increased at a rate of about five degrees Celsius per minute as indicated at 104 for an interval of about twenty minutes to a temperature of 200° C. (point 106). Denitration is observed below 200° C. by a sudden vigorous charring wave that propagates over the entire surface of the mantle socks 70.

Immediately after denitration, the support 72 with denitrated socks 70 is transferred to an air oven (Kerr Sybron model 999) preheated to 240° C. (point 108). The oven temperature is increased at a rate of about 1.7° C. per minute interval 110) to a temperature of about 320° C. (point 112) and then at a rate of about 2.7° C. per minute (interval 114) to a temperature of 450° C. (point 116)). Heating to 320° C. and above causes a continual charring and shrinkage of the mantle until at about 400° C. to 420° C., the charred portion is oxidized to leave a shrunken mantle of white metal oxide. The mantle support fixture 72 is then transferred to an air furnace maintained at 1000°, (point 118), and after a ten minute interval (120) the mantle fixture 72 with white metal oxide mantles 30 shrunken on support tubes 28 are removed from the furnace. Each mantle subassembly is then exposed to a temperature of about 1600° C. for five minutes to further shrink and densify the metal oxide fabric. The resulting mantle subassemblies have shock resistance figures of merit of over 3.6 g-meters and withstand shock loads of over 600 g's.

The support tube-mantle subassembly is assembled into the flashlight unit 10 as indicated in FIG. 1. In that assembly, the flashlight has an output of about twelve lumens with a butane fuel flow rate of seven cubic centimeters/minute and an air fuel ratio of about 30:1. The flashlight 10 has an operating life of about twenty hours continuous operation.

In another mantle manufacturing process, viscose rayon yarn (300 denier/50 filament) is knitted into a continuous tubular sleeve of about 44 millimeters in diameter using a circular knitter with 45 needles in the arbor, the yarn being knitted with tension on both the yarn and the knitted sleeve to attain eight stitches per linear inch of tensioned sleeve.

An imbibing solution is formed by dissolving hydrated ytterbium nitrate ($Yb(NO_3)_3 \cdot 5\ H_2O$) powder (reagent grade) in distilled water (together with a small amount of a non-ionic wetting agent such as Triton X-100) to provide a solution 1.26 molar in ytterbium nitrate. In processing sequences of the type illustrated in FIG. 4, an imbibed sleeve is formed into a mantle sock and is placed in a tubular oven that is about 1.2 meters in length and about five centimeters in inner diameter. At ambient temperature (about 25° C. (point 80 - FIG. 4)), the oven is flushed with tank nitrogen at flow rates of 200 to 400 cubic centimeters per minute and hydrogen at flow rates of two to four cubic centimeters per minute (flow velocities of about ten to twenty centimeters per minute). With these inert-scavenging atmospheres (volume percents of hydrogen in the range of one - four percent) in the oven, the oven temperature is increased at a rate of about five degrees Celsius per minute as indicated at line 82. The mantle fabric 70 undergoes denitration at about 150° C. (point 84). At this point the fabric color changes rapidly from white to golden tan, the added hydrogen reducing the vigor of the "nitrate burn" that occurs in the absence of the oxygen scavenging agent. Immediately after this color change (point 84), the hydrogen flow is terminated and oxygen is added to the nitrogen flow at rates of about ten to twenty cubic centimeters per minute. Heating continues at the same rate as indicated by line 86 to a temperature of about 325° C. (point 88). During this time the color continuously changes from golden tan to dark brown or black with modest shrinkage (about 10%) of the fabric, which indicates additional decomposition of the organic material. Continuing from point 88, the oven temperature is then held at about 325° C. for as long as it takes the mantle to turn from black to light gray or white (about two hours). During this soaking interval (indicated by line 90 in FIG. 4), the remaining carbon is oxidized and driven off and the mantle shrinks to about ⅓ its original dimensions (about 34% open area) with its skirt portion 54 shrunk onto sleeve 28 essentially as shown in FIG. 2. At the end of the soaking interval, (at point 92) the flow of oxygen is increased to eighty to one hundred sixty cubic centimeters per minute (a resulting gas mixture of about 28% oxygen) and the oven temperature is rapidly increased as indicated at line 94 to a temperature of 900° C. (point 96). The heater is then turned off and the oven cools to ambient temperature as indicated at 98. After cooling, the ytterbia mantle subassembly is exposed to a burning mixture of isobutane and air (at an estimated temperature of about 1600° C.) for five minutes to further shrink and densify the metal oxide fabric. Alternatively, the mantle may be further shrunk and densified by heating in a tube-furnace (e.g., Lindberg Type 54434) in air to 1400° C. The resulting mantles (about thirteen millimeters in diameter and about eighteen millimeters in length (extension)) withstood shock loads of 400–600 g (shock resistance figures of merit (extension$^2$/diameter) in the range of about 10–12 g-meters).

Another mantle support tube subassembly in accordance with the invention, formed with an imbibing solution about 0.89 molar in thorium nitrate, 0.01 molar in cerium nitrate and 0.02 molar in zirconium and processed after denitration with a sequence that included a twenty-four hour soaking interval at 320° C. and final heating in a gas-oxygen flame, withstood a shock load of 850 g (a shock resistance figure of merit of about 5.0). Still another mantle support tube subassembly in accordance with the invention, formed with an imbibing solution about 0.89 molar in thorium nitrate, 0.01 molar in cerium nitrate and 0.01 molar in aluminum nitrate and processed after denitration with a sequence that included a twenty-four hour soaking interval at 300° C. and final heating in an isobutane flame, withstood a shock load of 910 g (a shock resistance figure of merit of about 5.5 g-meters).

While particular embodiments of the invention have been shown and described, various modifications will be apparent to those skilled in the art, and therefore it is not intended that the invention be limited to the disclosed embodiments or to details thereof, and departures may be made therefrom within the spirit and scope of the invention.

What is claimed is:

1. A process for producing a sturdy refractory metal oxide article comprising the steps of heating a substrate of organic material impregnated with a metal compound to increase at a controlled rate the temperature of said impregnated substrate to a temperature sufficiently high to thermally decompose said metal compound as a step in the conversion of said metal compound to a refractory metal oxide without substantial thermal decomposition of said organic substrate material;

further heating said impregnated substrate to decompose and remove said organic material from said impregnated substrate and to complete the conversion of said metal compound to said refractory metal oxide so that a metal oxide replica of said substrate remains; and further heating said metal oxide replica to sinter and densify said metal oxide replica such that said densified metal oxide replica has a strength (shock resistance) figure of merit of at least three g-meters, and said replica retains such strength after said replica has been heated to a temperature of 1500° C.

2. The process of claim 1 wherein said metal compound is a nitrate.

3. The process of claim 1 wherein said metal compound includes the nitrate of a metal selected from the group consisting of erbium, hafnium, thorium, ytterbium, yttrium, other rare earth metals, and zirconium; the nitrate of a radiation modifying dopant selected from the group consisting of cerium and other rare earth metals, the radiation modifying dopant metal being different from the host metal, and the nitrate of a strengthening dopant selected from the group consisting of aluminum, beryllium, magnesium, yttrium, zirconium and calcium, the strengthening dopant metal being different from the host metal.

4. The process of claim 1 wherein said impregnated substrate is heated to thermally decompose said metal compound in a substantially oxygen free atmosphere.

5. The process of claim 1 wherein said impregnated substrate is heated to thermally decompose said metal compound in less than one hour.

6. The process of claim 1 wherein said step of further heating of said impregnated substrate to decompose and remove said organic material and to complete the conversion of said metal compound to said refractory metal oxide so that a metal oxide replica of said substrate remains has a duration of less than three hours.

7. The process of claim 6 wherein said step of further heating of said impregnated substrate to decompose and remove said organic material and to complete the conversion of said metal compound to said refractory metal oxide so that a metal oxide replica of said substrate remains is in an atmosphere in which the partial pressure of oxygen exceeds twenty mm Hg.

8. A radiation emitter made according to the process of claim 1.

9. The process of claim 1 wherein said substrate of organic material is impregnated with a solution of said metal compound that has a molar strength of less than 2.0.

10. The process of claim 9 wherein said metal compound solution has a molar strength in the range of 0.8–1.0.

11. The process of claim 9 wherein said metal compound solution has a molar strength in the range of 1.1–2.0.

12. The process of claim 1 wherein said substrate of organic material is a fabric composed of fibers of organic material.

13. The process of claim 12 wherein the open area of said fabric is in excess of fifty percent.

14. The process of claim 1 wherein said substrate is a fabric sleeve, and further including the step of supporting said sleeve during said heating steps on a fixture that carries a support tube so that the skirt of said sleeve overlies said support tube, the skirt of said sleeve being shrunk during said heating steps against the outer surface of said support tube to form a mantle - support tube subassembly.

15. The process of claim 14 wherein said sleeve is formed into a sock that has a closed end, and said fixture includes a post on which said support tube is received, the top of said post supporting the closed end, of said sock.

16. The process of claim 15 wherein said sock is shrunk onto said support tube by said sequence of heating steps to provide a subassembly with a metal oxide fabric shell that defines a volume of less than about 0.2 cc, and that has in excess of fifty percent open area.

17. A radiation emitting mantle made according to the process of claim 16.

18. A process for producing a sturdy refractory metal oxide article comprising the steps of heating a substrate of organic material impregnated with a metal compound in a substantially oxygen-free atmosphere to increase at a controlled rate the temperature of said impregnated substrate to a temperature sufficiently high to thermally decompose said metal compound as a step in the conversion of said metal compound to a refractory metal oxide without substantial thermal decomposition of said organic substrate material;

further heating said impregnated substrate in an atmosphere containing an increased amount of oxygen (at least one percent oxygen) to decompose and remove said organic material from said impregnated substrate and to complete the conversion of said metal compound to said refractory metal oxide so that a metal oxide replica of said substrate remains; and further heating said metal oxide replica to sinter and densify said metal oxide replica such that said densified metal oxide replica is sturdy and retains such strength after said replica has been heated to a temperature of 1500° C.

19. The process of claim 18 wherein said metal compound a host metal compound selected from the group consisting of compounds of erbium, hafium, thorium, ytterbium, yttrium, other rare earth metals, and zirconium.

20. The process of claim 19 wherein said metal compound is a nitrate.

21. The process of claim 20 wherein said impregnated substrate is heated to thermally decompose said metal compound in less than one hour, and said step of further heating of said impregnated substrate to decompose and remove said organic material and to complete the conversion of said metal compound to said refractory metal oxide so that a metal oxide replica of said substrate remains is in an atmosphere in which the partial pressure of oxygen exceeds twenty mm Hg and has a duration of less than three hours.

22. A radiation emitter made according to the process of claim 21.

* * * * *